Jan. 28, 1958     A. T. RACE, JR     2,821,415
GROOVED AND INTERNALLY REINFORCED PIPE END
Filed April 9, 1953     2 Sheets-Sheet 1

INVENTOR
Austin T. Race, Jr.

BY Mason, Fenwick & Lawrence
ATTORNEYS

Jan. 28, 1958 A. T. RACE, JR 2,821,415
GROOVED AND INTERNALLY REINFORCED PIPE END
Filed April 9, 1953 2 Sheets-Sheet 2
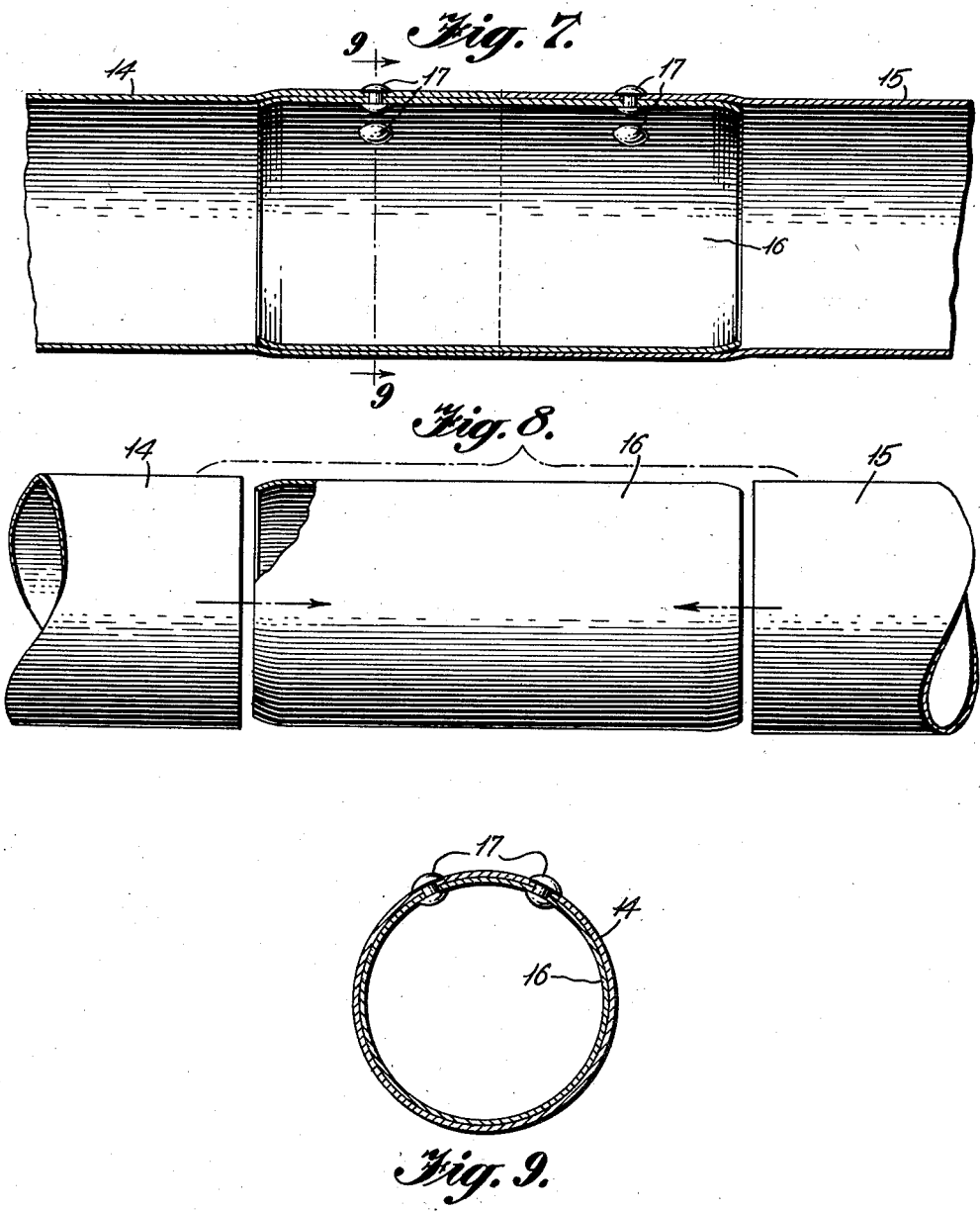
INVENTOR
Austin T. Race, Jr.
BY Mason, Fenwick & Lawrence
ATTORNEYS United States Patent Office 2,821,415
Patented Jan. 28, 1958

2,821,415

GROOVED AND INTERNALLY REINFORCED PIPE END

Austin T. Race, Jr., Winter Haven, Fla., assignor to Race & Race, Inc., Winter Haven, Fla., a corporation of Florida Application April 9, 1953, Serial No. 347,663

2 Claims. (Cl. 285—112)

This invention relates to a method for reinforcing and/or joining the ends of thin walled pipe sections, and to pipe having such reinforced or joined ends, and particularly to such method and pipe wherein the reinforced ends are adapted to be coupled together in end to end relationship. This is a continuation in part of application, Serial No. 225,354, filed May 9, 1951, and now abandoned.

In many fields, it is desirable to couple sections of pipe by means of a coupling similar to that shown in U. S. Patent No. 1,541,601. This type of coupling has many advantages, but it has been impossible heretofore to use it except with pipe having heavy gauge walls which would permit the cutting of an annular groove near the pipe end to receive the coupling flanges. This results in an extremely heavy and costly installation.

Thin-walled tubing will withstand high internal pressures and has many advantages over the heavy tubing; but, due to the light gauge of the metal, it is impossible to cut the required annular groove. Attempts to form a groove by rolling have met with little success, as high pressures in the line cause the metal of the groove to be swaged and the sections come apart at the coupling. Another expedient employed was to weld a short section of heavy gauge metal onto the end of thin-walled tubing. The heat of the welding caused the metal in the surrounding area to drop back to its original annealed strength, thus forming a weak spot in the vicinity of the weld which ruptured under high internal pressure. It was proposed to roll a groove near the end of the tube and insert a ring into the end of the tube extending from the groove to the tube end. Here again the pressure swaged the metal, erasing the groove, forcing the ring from the tube end, and allowing the coupling to separate. Attempts to reinforce the end of tubing or join sections of tubing by the use of a force-fitted tube have proven unsatisfactory.

It is the purpose of the present invention to provide a method for reinforcing a thin-walled tube end to enable the formation of a coupling groove which will be shape retaining under pressures up to the bursting point of the tube.

Another object of the invention is to provide such a method whereby thin-walled tubing may have its ends accurately sized so that perfect registry of the tubing and precise fitting of the coupling member may be assured.

Still another object of the invention is to provide tubing having reinforced ends and provided with coupling grooves to receive the type of coupling mentioned above.

Yet another object is to provide a method for joining sections of thin-walled tubing in a permanent, water-tight manner.

Other objects of the invention will be apparent from the following description when taken in conjunction with the drawings which accompany and form a part of this specification.

In the drawings:

Figure 7 is a sectional view of the ends of two sections of tubing joined together in the manner of the present invention;

Figure 8 is a view of the ends of two sections of tubing and a joining sleeve in position to be inserted in the tube ends; and Figure 9 is a vertical section through one tube end and the joining sleeve, and is taken on the line 9—9 of Figure 7.

Figure 1:
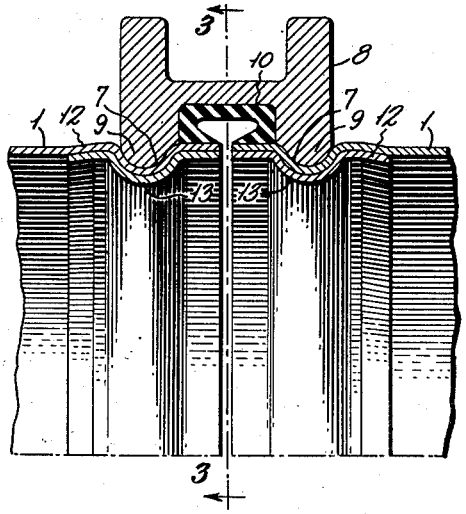
Figure 1 is a partial longitudinal sectional view showing one side of the abutting ends of two adjacent sections of tubing reinforced in accordance with the present invention, with the coupling and sealing gasket in place.

Referring to the drawings in detail and first adverting to the method of reinforcing a tube end, the invention resides in the manner of placing a reinforcing member within the end of a thin-walled section of tubing.

The tubing to be reinforced is quite light, both in weight and gauge, and is incapable of receiving a cut groove to which a coupling may be connected. The tubing is furnished to a plus or minus specification, and is usually found to be on the minus side. As it is important for a proper leak-proof joint that the tube ends be of uniform size, the present method contemplates sizing the tube ends during the reinforcing operation.

Figure 5:
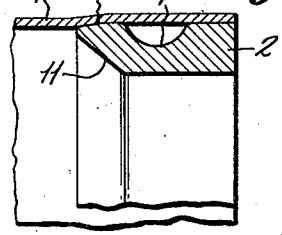
Figures 4, 5 and 6 illustrate progressive steps in the method for forming the reinforced ends.
Figure 6:
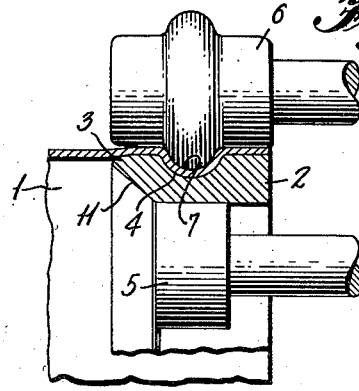
Figure 4:
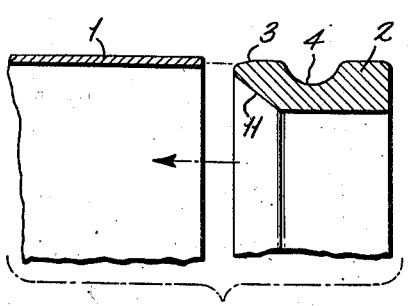

In carrying out the method, the steps illustrated in Figures 4 to 6, inclusive, are followed. The tubing 1, which may be of any diameter, light-gauge metal, preferably aluminum, has inserted into its end a reinforcing ring 2, which may be of the same material but of considerably heavier gauge. The outside diameter of the ring will be the required, standard, inside diameter of the tube. As the tubes are usually slightly undersize, the ring will be slightly larger than the inside of the tube. The ring is tapered slightly at one edge, as shown at 3, to provide a lead into the tube. The ring is also pre-grooved on its outer surface to provide the peripheral groove 4.

Due to the difference in diameters between the tube and ring, the ring is forced into the tube end under pressure until the outer ends of the tube and ring are flush. This will expand the tube end slightly, putting the tube under an expansion force and the ring under a compression force. The opposite forces will result in a tight frictional grip between the members resisting axial movement of the ring with respect to the tube. In fact, the grip between the two members will be sufficiently strong to render it unnecessary to supply holding means to prevent relative axial movement of the members during subsequent operations.

After the ring is properly inserted, forming rollers are used to press the material of the tube into the groove 4 of the ring to interlock the two members. The inner roller 5 may be flat transversely, as it bears upon the flat, inner periphery of the ring. The outer roller 6 will have a convex, central, peripheral rib to form the groove 7 in the tube, and flat end sections to roll the straight sections of the tube into contact with the ring throughout the length of the ring. The latter is necessary to insure all parts of the tube which may have been expanded during the insertion of the ring being brought into contact with the ring.

By having a pre-cut groove in the reinforcing ring, a guide is provided for grooving the tube. The convex ribs of the upper forming roller will be guided by the groove 4 in the ring, so that all chance of the forming roller tracking on the tube will be obviated.

Figure 2:
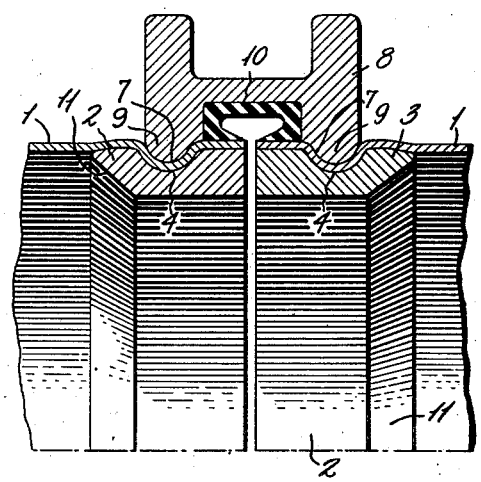
Figure 2 is a view similar to Figure 1 showing a different type of reinforcement.
Figure 3:
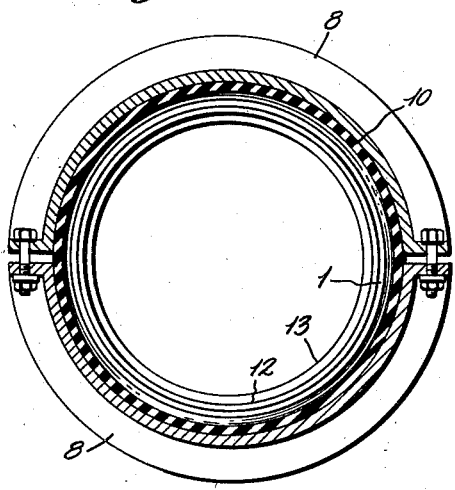
Figure 3 is a transverse section taken on the line 3—3 of Figure 1 showing the end of the tubing in elevation.

The method of reinforcement described is especially effective to provide proper reinforcement for tubes to be joined by a coupling such as is shown in Figures 1 to 3, inclusive. This coupling, as will be seen in Figure 3, is made of two semi-circular sections 8 adapted to be bolted together in clamping relation about the tube ends. Each section has two spaced, inwardly projecting ribs 9, which are adapted to engage the respective grooves 7 of abutting tube sections. An annular gasket 10 bridges the space between the tube ends, and has confronting tapered lip sections to bear against the outer surfaces of the end portions of the adjacent tubes to seal tightly against the tube surfaces when the pipe line is under pressure. This gasket and coupling structure are known in the art, but are described herein because of the cooperative relationship between the coupling and the reinforced tube end.

It will be observed that when the reinforced tubes are coupled by the members 8 a double lock is formed to prevent the groove in the tube from becoming swaged to allow the reinforcing ring to slip from the end of the tube. When pressure is built up in the pipe line the liquid in the line is free to fill the gasket and operates upon the confronting ends of adjacent tubes with an opposing force tending to separate the tubes. This will cause the coupling ribs to bear upon the inner side of the groove in the tube with a force acting toward the end of the tube. This force will be resisted by the abutting face of the groove in the reinforcing ring and, at the same time, by the opposite side of the ring groove bearing against the underside of the opposite side of the tube groove. Thus, the friction between the tube and ring is increased, the coupling ring preventing outward movement of the metal in the groove of the tube, and increased pressure serves to increasingly bind the tube and ring together.

The parts used in the described method are shown assembled in Figure 2 with the coupling and gasket in place. The reinforcing ring is preferably beveled on its inner under-periphery as at 11, to prevent obstruction to the free flow of liquid through the line.

The showing in Figures 1 and 3 is similar to that described, except that a sleeve 12 of light gauge metal is used to reinforce the tube instead of the heavy ring shown in the other figures of the drawings. The sleeve 12 will be provided with a pre-formed groove 13, and inserted into the tube under pressure in the same manner as the ring. After insertion of the sleeve, a groove is formed in the tube seating in the groove in the sleeve. In both the sleeve reinforcement and the ring reinforcement, the frictional hold between the tube and the reinforcing member will be sufficient to hold the parts in position during the formation of the tube groove without the aid of clamping means.

Referring now to Figures 7 to 9 inclusive, the ends of two sections of thin-walled tubing 14 and 15 are shown joined by a coupling sleeve 16. Sleeve 16 serves to join the ends of the tubes and to reinforce these ends as well.

Sleeve 16 is of slightly larger outside diameter than the inside diameter of the tubes to be joined, to the same degree as the reinforcing ring previously described. The sleeve has its ends rolled inwardly to provide inclined surfaces to lead the sleeve into the tubes. Considerable pressure must be used to insert the sleeve into the tubes, as the tube ends will be expanded by the entrance of the larger sleeve. It has been found that the sleeve will expand the tubes smoothly if the inserting movement of the sleeve is continuous until fully seated within the tube ends.

When the sleeve is in place, as shown in Figure 7, the tube ends and sleeve will be under the same expansion and compression forces, respectively, as previously described. This will create the frictional hold necessary to prevent separation of the members under the pressure to which the unit will be subjected, and will form a completely water-tight joint.

To ensure the members remaining in tight engagement regardless of rough handling, one or more holes are drilled through the ends of the tubes and sleeve and explosive rivets 17 are inserted. By the application of heat, the inner ends of the rivets will be caused to expand in tight engagement with the inner face of the sleeve in well-known manner.

It will be noted that in both the tube joining and tube end reinforcing, the ends of the tubes are expanded through the insertion of the sleeve. Thus ensures an extremely tight fit, and permits the practice of the method with assured results even though the tubing varies slightly in size. By using a sleeve which is larger than a standard inside diameter of tubing, the tube will be expanded. This expansion results in the oppositely acting compression and expansion forces which produce the required friction to create a very positive hold between the members.

While practical embodiments of the invention have been disclosed herein, it is to be understood that these are by way of example, and changes may be made from the precise structure shown within the scope of the appended claims.

What is claimed is:

1. A pipe joint comprising, thin-walled pipe sections having their ends reinforced and expanded to predetermined size with tubular pressure-fitted inserts in their ends, peripheral grooves in said inserts, inwardly rolled beads in said pipe sections fitting within the grooves in said inserts, a gasket surrounding the pipe ends, and a two-part coupling joining said pipe ends, each part of said coupling including a semi-cylindrical member having a pair of spaced inwardly projecting peripheral ribs to engage the depressed beads of the confronting pipe ends.

2. A pipe section having a sized and reinforced end for use with couplings of predetermined size comprising, a thin-walled cylindrical metallic tube having the major portion of its length of uniform diameter, a short cylindrical metallic insert having an outside diameter greater than the inside diameter of the major portion of the tube, said insert being pressure-fitted within the end of said tube and thereby expanding that portion of the tube coextensive with the insert to predetermined outside diameter, a peripherally indented region in said insert and a matching peripherally indented region in the tube seated within the indented region in the insert, said insert being held within the tube end by the conjunction of the friction fit of the insert within the tube end and the interfitting of the indented regions of the insert and tube.

References Cited in the file of this patent

UNITED STATES PATENTS

| | | |
|---|---|---|
| 458,038 | Rice | Aug. 18, 1891 |
| 563,728 | Barnes | July 14, 1896 |
| 604,664 | Koelbeck | May 24, 1898 |
| 715,641 | Cronk | Dec. 9, 1902 |
| 931,581 | Doyle | Aug. 17, 1909 |
| 946,207 | Doak | Jan. 11, 1910 |
| 1,255,417 | Hedges | Feb. 5, 1918 |
| 1,735,563 | Deckard | Nov. 12, 1929 |
| 1,799,855 | Mample | Apr. 7, 1931 |
| 2,011,433 | Blagg | Aug. 13, 1935 |
| 2,041,132 | Johnson | May 19, 1936 |
| 2,089,790 | Halpern | Aug. 10, 1937 |
| 2,168,631 | Scott | Aug. 8, 1939 |
| 2,429,293 | Peck | Oct. 21, 1947 |
| 2,499,241 | Courtot | Feb. 28, 1950 |

FOREIGN PATENTS

| | | |
|---|---|---|
| 16,054 | Great Britain | July 29, 1908 |
| 386,062 | Great Britain | Jan. 12, 1933 |